(12) United States Patent
Wachter

(10) Patent No.: US 7,462,099 B2
(45) Date of Patent: Dec. 9, 2008

(54) AIR-GUIDING SYSTEM FOR A VENTILATION SYSTEM OF A VEHICLE

(75) Inventor: Clemens Wachter, Stockheim (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 520 days.

(21) Appl. No.: 11/105,089

(22) Filed: Apr. 13, 2005

(65) Prior Publication Data

US 2005/0233687 A1 Oct. 20, 2005

(30) Foreign Application Priority Data

Apr. 15, 2004 (DE) .................... 10 2004 018 913

(51) Int. Cl.
*B60H 1/00* (2006.01)
*F24F 7/007* (2006.01)

(52) U.S. Cl. .................... 454/121; 454/69; 454/127; 454/156; 165/43

(58) Field of Classification Search .................... 454/69, 454/121, 124, 126, 145, 152, 125, 127, 156; 137/625.44, 875; 165/43

See application file for complete search history.

(56) References Cited

U.S. PATENT DOCUMENTS

| | | | | |
|---|---|---|---|---|
| 3,270,775 A | * | 9/1966 | Alderson | 137/625.44 |
| 4,354,528 A | * | 10/1982 | McAndrew | 137/875 |
| 4,615,262 A | * | 10/1986 | Taniguchi | 454/124 |
| 4,991,646 A | * | 2/1991 | Spears | 165/122 |
| 5,476,418 A | * | 12/1995 | Loup | 454/121 |
| 6,520,850 B1 | * | 2/2003 | Buckman et al. | 454/121 |
| 6,685,554 B2 | * | 2/2004 | Abouchaar | 454/121 |

FOREIGN PATENT DOCUMENTS

| | | | | |
|---|---|---|---|---|
| DE | 3805168 | A1 | * | 8/1989 |
| DE | 10147112 | A1 | * | 4/2003 |
| DE | 10155040 | A1 | * | 5/2003 |
| EP | 865945 | A1 | * | 9/1998 |
| JP | 55041354 | A | * | 3/1980 |

* cited by examiner

*Primary Examiner*—Steven B McAllister
*Assistant Examiner*—Patrick F. O'Reilly, III
(74) *Attorney, Agent, or Firm*—Howard & Howard Attorneys, P.C.

(57) ABSTRACT

An air-guiding system for a ventilation system of a vehicle comprises a supply duct (12), three discharge ducts (14, 16, 18) branching off from the latter and a control part (20), which has a main guiding element (24) with a main guiding vane (24*a*) and also a secondary guiding element, kept at a distance from the latter, with a secondary guiding vane (26) and can be pivoted about a pivot axis (22). The main guiding element (24) is provided with an auxiliary guiding vane (24*b*) which is connected at one of its ends to the main guiding vane (24*a*) at a fixed angle and on the opposite side has a free end, the main guiding vane (24*a*) together with the secondary guiding vane (26) distributing, as a function of the pivoting position of the control part (20), an air flow, arriving from the supply duct (12), between the discharge ducts (14, 16, 18), and the auxiliary guiding vane (24*b*) blocking off or at least constricting a direct flow path between two adjacent outflow ducts (16, 18). With just one control part (20) the air flow can be distributed from the supply duct (12) to three outflow ducts (14, 16, 18) in a manner favorable for flow and optimally.

12 Claims, 2 Drawing Sheets

AIR-GUIDING SYSTEM FOR A VENTILATION SYSTEM OF A VEHICLE

BACKGROUND OF THE INVENTION

The invention relates to an air-guiding system for a ventilation system of a vehicle, having a supply duct, a plurality of discharge ducts branching off from the latter and a control part, which has a main guiding element with a main guiding vane and also a secondary guiding element, kept at a distance from the latter, with a secondary guiding vane and can be pivoted about a pivot axis.

DESCRIPTION OF THE PRIOR ART

An air-guiding system of this generic type has already been described in DE 101 55 040 A1. With this air-guiding system, an air flow, which enters into a distributor housing, can be distributed between two discharge ducts. In one extreme position of the control part, its main guiding element completely blocks the clear cross section of one of the discharge ducts. In the embodiment described, this is a discharge duct for the footwell of the vehicle. In this extreme position, both guiding elements of the control part are situated in a manner favorable for flow in the path of the air flow to various discharge vents in the upper region of the vehicle interior. In the opposite extreme position of the control part, its guiding elements are directed transversely to the arriving air flow, with the secondary guiding element protruding further into the air flow than the main guiding element, so that a large proportion of the air is branched off into the discharge duct that leads to the discharge vents in the footwell of the vehicle.

However, with this known air-guiding system, the air flow can be distributed only to two discharge ducts.

SUMMARY OF THE INVENTION

The invention provides an air-guiding system for a ventilation system of a vehicle which can be used to distribute the air flow to three outflow ducts.

According to the invention, in the case of the air-guiding system of the generic type indicated at the beginning, the main guiding element is provided with an auxiliary guiding vane which is connected at one of its ends to the main guiding vane at a fixed angle and on the opposite side has a free end, the main guiding vane together with the secondary guiding vane distributing, as a function of the pivoting position of the control part, an air flow, arriving from the supply duct, between the discharge ducts, and the auxiliary guiding vane blocking off or at least constricting a direct flow path between two adjacent outflow ducts. Although also in the case of the air-guiding system according to the invention, the control part only has a main guiding element and an auxiliary guiding element, the air flow arriving through the inflow duct can be distributed optimally to three discharge ducts by pivoting of the control part. This is achieved essentially by means of the additional auxiliary vane and a skillful arrangement of the various ducts and of their opening apertures in the region of the control part. A variable distribution of the air flow to the three discharge ducts can be realized as a function of the arrangement of the guiding elements. The shape of the main guiding vane is, in principle, freely selectable.

It is therefore particularly expedient if the auxiliary guiding vane is connected to the main guiding vane in the vicinity of the pivot axis and the auxiliary guiding vane is arranged essentially parallel to the main guiding vane. This results in a particularly compact embodiment which is favorable in terms of flow. in contrast to the guiding system according to DE 101 55 040 A1, in which the pivot axis of the control part is arranged at a distance from the main guiding element on the side thereof which faces away from the auxiliary guiding element, in the case of the guiding system according to the invention, the compactness is further increased by the fact that the main guiding element has a hub, which surrounds the pivot axis and is connected to the main guiding vane in a central region between the free ends thereof, and by the fact that the auxiliary guiding vane is connected to the hub. In this case, the pivot axis may be adjacent to the main guiding vane, so that the pivoting space of the control part manages overall with a small volume.

A particularly skillful arrangement of the flow ducts is produced, in the case of a preferred embodiment, by the fact that the adjacent outflow ducts have an outflow direction which is deflected by the control element and is essentially opposed to the direction of flow in the supply duct. In this case, one of the outflow ducts essentially continues the direction of flow in the supply duct. This is preferably the outflow duct which leads to the discharge vents in the upper region of the vehicle interior. By contrast, the adjacent discharge ducts are preferably those which lead to the discharge vents in the footwell of the vehicle interior.

BRIEF DESCRIPTION OF THE DRAWINGS

Further advantageous embodiments of the invention emerge from the subclaims and from the description below with reference to the attached drawings. In the drawings:

DESCRIPTION OF THE PREFERRED EMBODIMENTS

Figure 1:
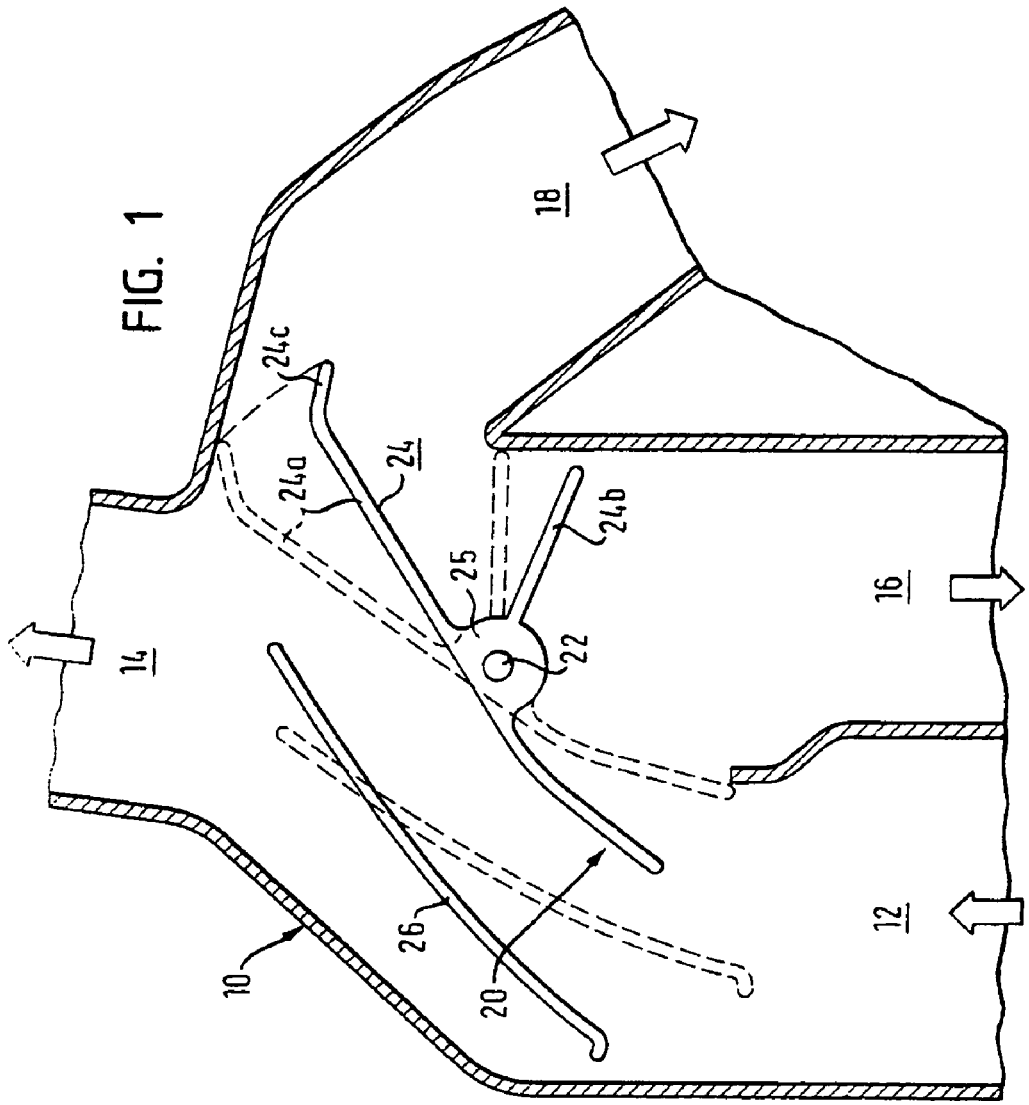
FIG. 1 shows a schematic sectional view of a distributor housing into which a supply duct opens and from which three outflow ducts emerge, with a control part in an intermediate position and, illustrated by dashed lines, in a first end position.

The distributor housing, which is shown in the figures and is denoted in general by 10, of the air-guiding system is part of a ventilation, heating and/or air-conditioning system of a vehicle. A supply duct 12 opens into the distributor housing 10 and introduces a conditioned air flow into the interior of the distributor housing 10. Three outflow ducts 14, 16 and 18 emerge from the distributor housing 10. The first outflow duct 14 essentially continues the direction of flow in the supply duct 12 and is offset laterally with respect to the latter toward the center of the distributor housing 10. The second outflow duct 16 is directly adjacent to the supply duct 12 and emerges from the distributor housing 10 in the opposite direction to said supply duct. The third outflow duct 18 is adjacent to the second outflow duct 16 and emerges from the distributor housing 10 at an acute angle to said outflow duct 16. In the two adjacent outflow ducts 16, 18, the direction of flow is therefore essentially opposed to that in the supply duct 12.

Within the distributor housing 10, a control part 20 is mounted pivotably about an axis 22. The control part 20 comprises a main guiding element 24 with two vanes, which extend continuously in a sheet-like manner on both sides of the axis 22 and are referred to here together as the main guiding vane 24a, an auxiliary guiding vane 24b, which extends from a hub 25, which surrounds the axis 22, at an acute angle of approximately 30° to the main guiding vane 24a, and also a secondary guiding vane 26, which is arranged at a distance from the main guiding element 24 and parallel to the main guiding vane 24a thereof. The axis 22 is situated within the distributor housing 10—with reference to FIG. 1—above the outflow duct 16, below the outflow duct 14 and laterally between the supply duct 12 and the outflow duct 18.

The position of the control part 20 that is shown by solid lines in FIG. 1, is an intermediate position which corresponds to a normal operating position. In this position, the air from the inflow duct 12 is distributed to all three outflow ducts 14, 16 and 18. The main guiding vane 24a of the main guiding element 24 projects with its shorter vane part into the supply duct and thus branches off an air flow into the outflow duct 16. This air flow is deflected by the auxiliary guiding vane 24b into the outflow duct 16. In this position, the auxiliary guiding vane 24b provides a seal with respect to the opening aperture of the adjacent outflow duct 18. This flow path may optionally also just be greatly constricted. That surface of the main guiding vane 24a which faces away from the auxiliary guiding vane 24b bounds together with the opposite surface of the secondary guiding vane 26 a flow duct which opens partially into the outflow duct 14 and partially into the outflow duct 18, where the flow is deflected. This deflection is assisted by an end 24c of the main guiding vane 24a, which end is angled toward the outflow duct 18. Furthermore, the secondary guiding vane, with its surface facing away from the main guiding vane and the opposite inner surface of the distributor housing 10, bounds a flow duct which opens into the outflow duct 14.

The position of the control part 20 that is shown by dashed lines in FIG. 1 is an end position, in which the control part 20 blocks off the two adjacent outflow ducts 16, 18 which—in the example taken—lead to the discharge vents in the footwell. In this position, the main guiding vane 24a spans the two adjacent outflow ducts 16, 18 and thus completely covers the opening apertures thereof in the distributor housing 10. The auxiliary guiding vane 24b does not have a guiding function here. The secondary guiding vane 26 is situated in a manner favorable for flow in the connecting path between the supply duct 12 and outflow duct 14; this connecting path is bounded by the main guiding vane 24a toward the outflow ducts 16, 18 in a manner favorable for flow. The air flow from the supply duct is therefore supplied in a virtually loss-free manner and entirely to the outflow duct 14 which distributes it—in the example taken—to the discharge vents in the upper region of the vehicle interior (discharge vents in the dashboard carrier, defroster nozzles etc.).

Figure 2:
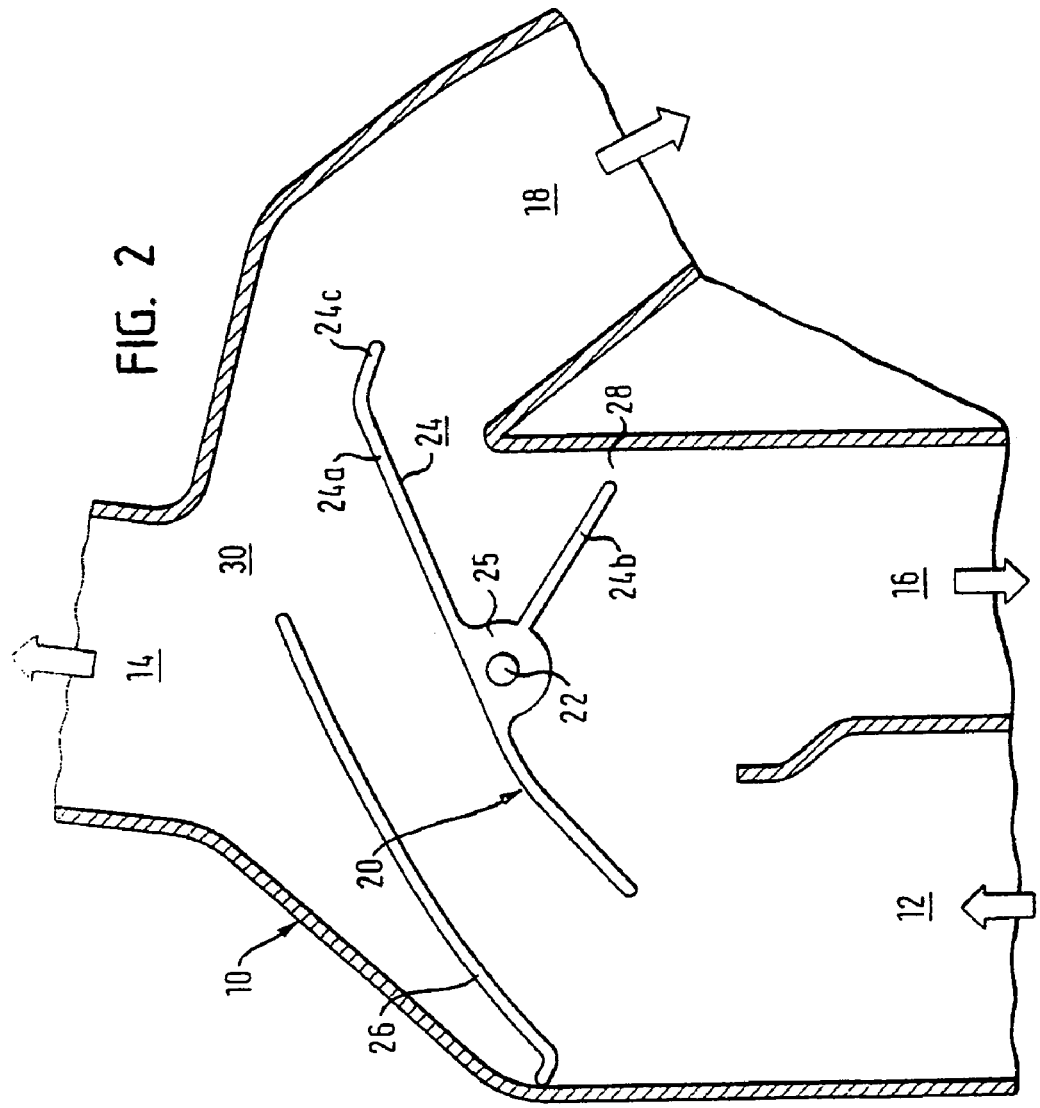
FIG. 2 shows the distributor housing with the control part in a second end position.

FIG. 2 shows the control part in the opposite end position. In this position, the air flow from the supply duct 12 is preferably supplied approximately in equal parts to the adjacent outflow vents 16, 18 without, however, blocking off the supply duct 14. The function of the main guiding vane 24a is essentially the same as in the intermediate position shown in FIG. 1; the only change is that the passage cross sections to the outflow ducts 16, 18 are enlarged and the free end of the shorter vane part protrudes further out of the supply duct 12 into the air flow. The auxiliary guiding vane 24b lies with its free end at a short distance from the opposite inner surface of the distributor housing 10 and thus forms a narrow passage gap 28. This passage gap 28 increases the proportion of the air flow of the outflow duct 18 by a partial flow which is directed toward the main guiding vane 24a and is deflected by the latter, reinforced by the angled, free end 24c, to the outflow duct 18. The secondary guiding vane 26 uses a free end to provide a seal on the inner surface of the distributor housing 10 and up to its opposite end shields the major part of the opening aperture of the outflow duct 14, but leaves a relatively wide passage gap 30 free. A partial flow is formed between the secondary guiding vane 26 and the opposite surface of the main guiding vane 24a and is predominantly directed toward the outflow duct 18, from which, however, part is branched off to the outflow duct 14 with the passage gap 30.

The invention claimed is:

1. An air-guiding system for a ventilation system of a vehicle, having a supply duct (12), a plurality of discharge ducts (14, 16, 18) branching off from the latter and a control part (20), which has a main guiding element (24) that can be pivoted about a pivot axis (22) with a main guiding vane (24a) having two vanes which extend continuously in a sheet-like manner on both sides of the axis (22) and also a secondary guiding element, kept at a distance from and parallel to the main guiding vane (24a), with a secondary guiding vane (26), the main guiding element (24) has a hub (25), which surrounds the pivot axis (22) and is connected to the main guiding vane (24a) in a central region between free ends thereof, the main guiding element (24) is provided with an auxiliary guiding vane (24b) which is connected at one of its ends to the hub (25) of the main guiding vane (24) at a fixed angle and on the opposite side has a free end, the main guiding vane (24a) together with the secondary guiding vane (26) distributing, as a function of the pivoting position of the control part (20), an air flow, arriving from the supply duct (12), between the discharge ducts (14, 16, 18), and the auxiliary guiding vane (24b) variably blocking off or at least variably constricting a direct flow path between two adjacent outflow ducts (16, 18) depending on the position of the control part (20).

2. An air-guiding system according to claim 1, characterized in that the auxiliary guiding vane (24b) is connected to the main guiding vane (24a) in the vicinity of the pivot axis (22).

3. An air-guiding system according to one of claims 1 to 2, characterized in that the adjacent outflow ducts (16, 18) have an outflow direction which is deflected by the control element (20) and is essentially opposed to the direction of flow in the supply duct (12).

4. An air-guiding system according to claim 3, characterized in that one (14) of the outflow ducts essentially continues the direction of flow in the supply duct (12).

5. An air-guiding system according to one of claims 1 to 2, characterized in that one (14) of the outflow ducts essentially continues the direction of flow in the supply duct (12).

6. An air-guiding system according to claim 5, characterized in that the control element (20) has a first end position, in which it uses its main guiding vane (24a) to block off the supply duct (12) from the two adjacent outflow ducts (16, 18) and guides the air flow in an essentially unconstricted manner into an outflow duct (14), which continues the direction of flow of the supply duct (12).

7. An air-guiding system according to one of claims 1 to 2, characterized in that the control element (20) has a first end position, in which it uses its main guiding vane (24a) to block off the supply duct (12) from the two adjacent outflow ducts (16, 18) and guides the air flow in an essentially unconstricted manner into an outflow duct (14), which continues the direction of flow of the supply duct (12).

8. An air-guiding system according to claim 7, characterized in that the control element (20) has a second end position, in which it
uses the secondary guiding vane (26) to constrict the flow path from the supply duct (12) to an outflow duct (14), which continues its direction of flow,
forms, starting from the supply duct (12), a flow path which is deflected by the main guiding vane (24a) and the auxiliary guiding vane (24b) into the first (16) of the two adjacent outflow ducts, forms between the secondary guiding vane (26) and the main guiding vane (24*a*) a flow path which is deflected into the second (18) of the two adjacent outflow ducts.

9. An air-guiding system according to claim 8, characterized in that, in the second end position of the control element (20), the auxiliary guiding vane (24*b*) opens up a passage gap between the two adjacent outflow ducts (16, 18).

10. An air-guiding system according to claim 9, characterized in that the main guiding vane (24*a*) of the control element (20) has an angled, free end which causes an increased deflection of the flow to the second (18) of the adjacent outflow ducts.

11. An air-guiding system according to claim 10, characterized in that the supply duct (12) opens into a distributor housing (10), in which the control element (20) is mounted, and from the distributor housing (10) emerge:

a first outflow duct (14), which essentially continues the direction of flow of the supply duct (12), a second outflow duct (16), which is adjacent to the supply duct (12) and has a direction of flow opposed to the latter, a third outflow duct (18), which is adjacent to the second outflow duct (16) and is oriented at an acute angle to the second outflow duct (16).

12. An air-guiding system according to one of claims 1 to 2, characterized in that the supply duct (12) opens into a distributor housing (10), in which the control element (20) is mounted, and from the distributor housing (10) emerge:

a first outflow duct (14), which essentially continues the direction of flow of the supply duct (12), a second outflow duct (16), which is adjacent to the supply duct (12) and has a direction of flow opposed to the latter, a third outflow duct (18), which is adjacent to the second outflow duct (16) and is oriented at an acute angle to the second outflow duct (16).

\* \* \* \* \*